United States Patent Office 2,900,573
Patented Aug. 18, 1959

2,900,573

RESISTANCE WELDING CONTROL FOR BENCH WELDER

William E. Large, Clarence, N.Y., assignor to Westinghouse Electric Corporation, East Pittsburgh, Pa., a corporation of Pennsylvania Application August 12, 1957, Serial No. 677,672

19 Claims. (Cl. 315—165)

This invention relates to electric discharge apparatus and has particular relation to apparatus for controlling the operation of low power resistance welders. Such welders are used typically for joining the parts of electric discharge tubes and are frequently called bench welders.

A typical bench welder control is shown in Hartwig et al. Patent No. 2,679,021. While this control has operated highly satisfactorily, it has been found that for certain purposes a control capable of setting the magnitude and the duration of the welding current highly precisely is necessary and it is an object of this invention to provide such a precise control.

Another object of this invention is to provide a novel electronic circuit particularly suitable for use in a precise control of the above described type but having other uses.

A further object of this invention is to provide an electronic circuit including an electric discharge device which is controlled in a new way.

Still another object of this invention is to provide a precise control of relatively low cost for a bench welder.

In accordance with this invention, a control for a bench welder is provided which includes a timer, a heat control unit and a power supply unit. The timer, although of relatively low cost and simple structure is capable of precisely timing the duration of the welding current. This timer includes a pair of discharge devices which may be thyratrons; one energized from an alternating current supply and the other from a direct current supply. The cathodes of these devices are adapted to be connected by the operator's switch of the apparatus to a common supply terminal so that until the operator's switch is closed both devices are deenergized and after the operator's switch is closed both may be energized. The discharge device supplied from an alternating current supply is energized immediately on the closing of the operator's switch and supplies the potential for energizing the heat control unit. The other discharge device is controlled from a time-constant network charged from the anode potential of the first device through a rectifier of the type having low leakage such as a silicon rectifier. This network prevents the conduction of the second device until it times out and it starts to time out once the first device is rendered conducting. After the network times out, the second device is rendered conducting. This device is so connected to the first as to render the first non-conducting and to stop the welding. The cooperation of the device and the timing network is such that the timing is highly precise. The heat-control unit is of the type disclosed in an application Serial No. 675,306, filed July 31, 1957, and assigned to Westinghouse Electric Corporation to William E. Large and Donald R. Scholtes. The unit in cooperation with the power supply unit is capable of precisely setting the magnitude of the welding current.

The novel features considered characteristic of this invention are disclosed generally above. The invention itself, both as to its organization and as to its method of operation, together with its object and advantages will be understood from the following description of a specific embodiment when read in connection with the accompanying drawings in which:

Fig. 3 is presented only in an effort to help those skilled in the art to practice the invention disclosed herein and not with any intention of in any respect limiting the scope of this invention.

*Description*

Figure 1:
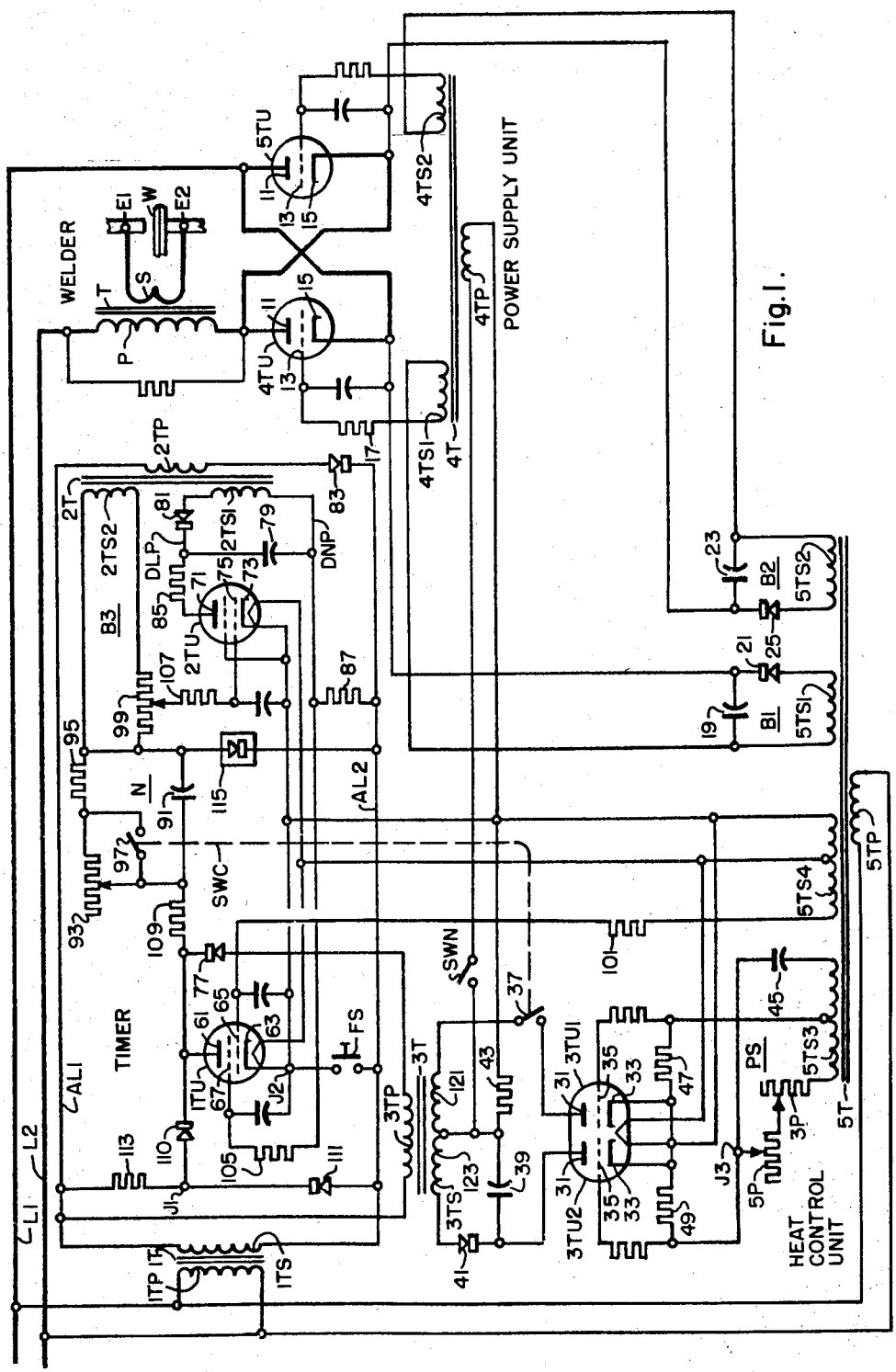
Figure 1 is a circuit diagram of a preferred embodiment of this invention.

The apparatus shown in the drawings includes a welder, a power-supply unit, a heat-control unit, and a timer. This apparatus is adapted to be applied from conductors L1 and L2 which may be energized from the buses of a commercial supply. Conductors L1 and L2 are usually connected to the supply buses through disconnects or circuit breakers (not shown). Potential for energizing the timer is driven from auxiliary conductors AL1 and AL2 which are applied from the secondary 1TS of a transformer 1T, the primary 1TP of which is energized from conductors L1 and L2.

The welder includes a welding transformer 1 having a primary P and a secondary S across which the welding electrodes E1 and E2 are connected. One of the electrodes, for example, E1 may be movable relative to the other and thus engagement between the electrodes E1 and E2 and work W may be effected.

The power-supply unit includes a pair of thyratrons 4TU and 5TU each having an anode 11, a cathode 13 and a control electrode 15. The anodes 11 and the cathodes 13 of the thyratrons 4TU and 5TU are connected in anti-parallel in series with the primary P between the conductors L1 and L2. The control electrode 15 of one thyratron 4TU is connected to the cathode 13 through a grid resistor 17, the secondary 4TS1 of a transformer 4T and a biasing network B1 which includes a capacitor 19 charged through a rectifier 21 from the secondary 5TS1 of a transformer 5T. In the absence of potential on secondary 4TS1 thyratron 4TU is maintained non-conducting by the charge on capacitor 19. The control electrode 15 of the thyratron 5TU is similarly connected to the cathode 13 through the secondary 4TS2 of the transformer 4T and a biasing network B2 including capacitor 23 charged by secondary 5TS2 through rectifier 25.

The heat-control unit includes a pair of discharge paths 3TU1 and 3TU2 which may be the paths of a double triode. Each path has an anode 31, a cathode 33 and a control electrode 35. These paths 3TU1 and 3TU2 are supplied with anode potential from the secondary 3TS of a transformer 3T. The secondary 3TS has an intermediate terminal and end terminals. One end terminal of the secondary 3TS is connected to the anode 31 of one of the paths 3TU1 through a contact 37 of a switch SWC capable of setting the apparatus for multi-cycle or half cycle operation. The intermediate terminal is adapted to be connected to the cathode of 3TU1 through a weld-no-weld switch SWN and the primary 4TP of transformer 4T. The other end terminal and the intermediate terminal of 3TS are connected across a capacitor 39 through a rectifier 41. The anode 31 of 3TU2 is connected to the plate of capacitor which is charged positively and the cathode 33 to the cathode 3TU2. The primary 4TP is loaded by a resistor 43 connected across the primary.

The discharge paths 3TU1 and 3TU2 are controlled by a phase shift network PS which is supplied from the conductors L1 and L2 through the transformer 5T. This transformer has a secondary 5TS3 having a center tap. The network includes a capacitor 45 connected in series with a pair of variable resistors 3P and 5P across the secondary 5TS3. Between the intermediate tap and the junction 53 of the capacitor 45, and the resistor 5P, a potential displaced in phase with reference to the potential between conductors L1 and L2 is derivable. These terminals are connected across a pair of resistors 47 and 49 which are in turn connected respectively between the control electrodes and the cathodes of paths 3TU1 and 3TU2. Phase displaced potentials of opposite phase are thus impressed between the control electrodes and the cathodes of the discharge paths 3TU1 and 3TU2. The phase of these potentials may be set by resistors 5P and 3P. Resistor 5P is set to correspond to the power factor of the apparatus during any operation. Resistor 3P may be set to render conducting the discharge devices 4TU and 5TU at the desired instants in the periods of the supply.

The timer includes a pair of thyratrons 1TU and 2TU. Thyratron 1TU has an anode 61, a cathode 63, first control electrode 65 and a second control electrode 67. Thyratron 2TU has an anode 71, a cathode 73, and a control electrode 75. The anode 61 of thyratron 1TU is connected to AL1 through the primary 3TP of transformer 3T and a rectifier 77 poled to conduct positive current from AL1 to the anode 61. The cathode 63 of 1TU is adapted to be connected to conductor AL2 through the operator's start switch FS. Thyratron 2TU is supplied with direct-current anode-cathode potential from conductors DLP and DNP. These conductors are energized from a capacitor 79 which is charged from the secondary 2TS1 of transformer 2T through a rectifier 81. The primary 2TP of transformer 2T is connected between conductors AL1 and AL2 through a rectifier 83. Positive conductor DLP is connected to the anode 71 of 2TU through an anode resistor 85; the negative terminal DNP is connected to the conductors AL2 and DNP. The cathode 63 of 2TU is directly connected to the cathode 63 of 1TU.

The timer also includes a network N and a supply of biasing potential B3. The network N includes capacitor 91 shunted by a variable resistor 93 and a fixed resistor 95. For half-cycle welding the variable resistor 93 may be shunted out by a contact 97 of the switch SWC which may be set either for half-cycle welding or for multicycle welding. The bias supply B3 includes a variable resistor 99 which is supplied with potential from the secondary 2TS2 of the transformer 2T.

The first control electrode 65 of thyratron 1TU is connected to the common junction J2 of the cathodes 63 and 73 through the secondary 5TS4 of transformer 5T and through a grid resistor 101. The resistor 101 in cooperation with the usual surge suppressing capacitor 103 connected between the first control electrode 65 and the cathode 63 shifts the potential impressed by 5TS4 so that the potential between the control electrode 65 and the cathode 63 derivable from 5TS4 leads the potential between the anode 61 and the cathode 63 by somewhat less than 180° so that thyratron 1TU can only be rendered conducting during a small fraction of a period at the beginning of each positive half period of anode-cathode potential. The second control electrode 67 of thyratron 1TU is connected to negative conductor DNP through a grid resistor 105 of relatively low magnitude.

The control electrode 75 of the thyratron 2TU is connected to the anode 61 of thyratron 1TU through a grid resistor 107, the bias B3, the network N and an additional resistor 109. The control electrode 75 is thus connected to the conductor AL1 through the primary 3TP and the associated rectifier 77. The junction of the anode 61 of 1TU and the resistor 107 is also connected through a rectifier 110 to a junction J1 between a rectifier 111 and a resistor 113 connected between the conductors AL1 and AL2 with the rectifier poled to conduct positive current from conductor AL2 to conductor AL1. The connection to the junction J1 serves to prevent clean-up of thyratron 2TU as is explained in a Patent 2,834,918, granted May 13, 1958 to Edward C. Hartwig for Electric Discharge Apparatus and assigned to Westinghouse Electric Corporation. The network N is also connected between conductors AL1 and AL2 through a rectifier 115 of the low back-leakage type such as silicon rectifier and the parallel network including the rectifier 110 connected to the junction J1 and the associated resistor 115 and the rectifier 77 and the primary 3TP. The latter rectifiers are of the ordinary selenium type and of substantially higher back-leakage than the rectifier 115.

The relationship between the potentials impressed on the various components of the timer is presented in Figs. 2a, 2b, 2c. In each of these views potential is plotted vertically and time horizontally. The curve which is sinusoidal in the left-hand portion of graph $a$ presents the anode potential of thyratron 1TU as a function of time. The portion of the curve above the axis represents the potential when the anode 61 of 1TU is negative relative to the cathode 63 and the portion below, the potential when the anode of 1TU is positive relative to the cathode. The generally saw-toothed curve below the axis of graph $a$ labelled N represents the potential on network N. It is assumed that the charging of the network is started at the beginning of the first positive half period of the curve representing the anode-cathode potential.

In graph $b$ the generally sinusoidal curve labelled anode $1TU+N$ represents the algebraic sum of two curves of graph $a$. The curve labelled B3 of graph $b$ represents the potential of network B3. The curve of graph $c$ represents the sum of the potentials of the two curves of graph $b$.

*Stand-by*

During the stand-by conductors L1 and L2 are energized so that the cathodes of the discharge devices and of the discharge paths 3TU1, 3TU2 are heated. Transformers 1T, 2T, 3T are also energized as are conductors AL1 and AL2.

Figure 2:
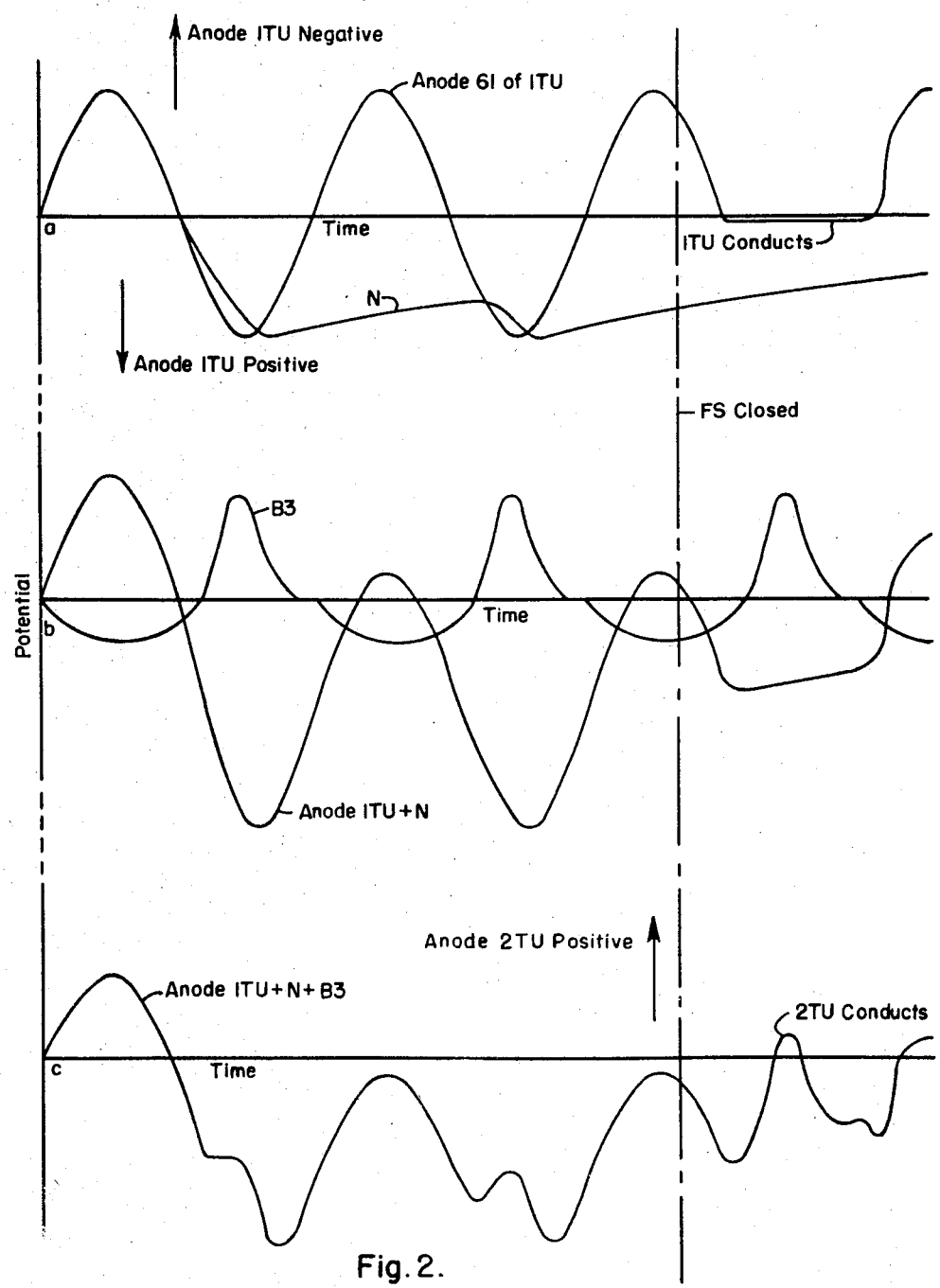
Fig. 2 is a graph illustrating the operation of the apparatus shown in Fig. 1.
Figure 3:
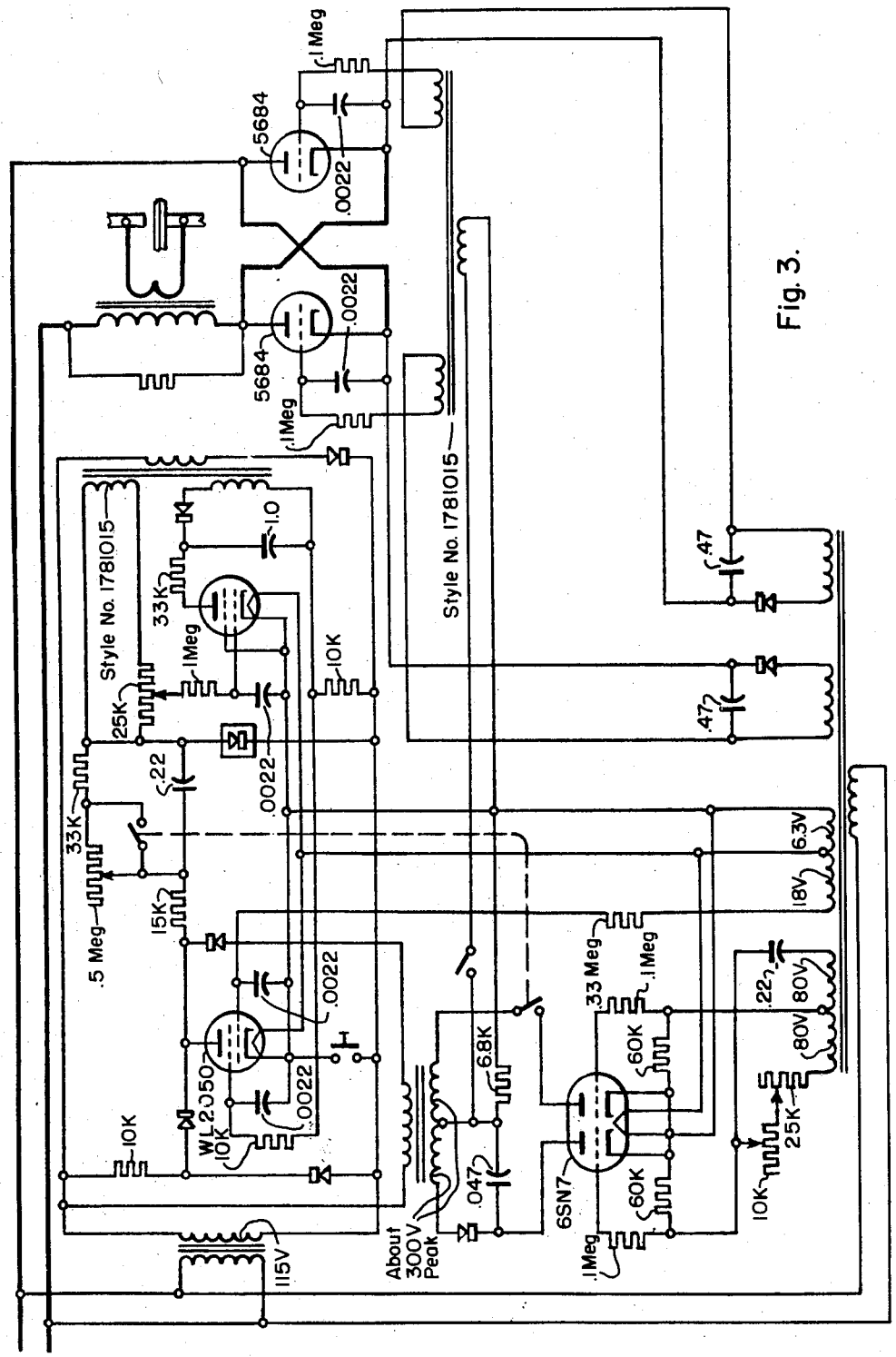
Fig. 3 is a circuit diagram similar to Fig. 2 but showing the magnitudes of the components of apparatus which has been built and found to operate with the precision of timing and current magnitudes demanded.

At this time the operator's switch FS is open so that thyratron 1TU and thyratron 2TU are non-conducting but the charging circuit network N is closed and the network N is charged to a negative potential as represented in graph $a$ of Fig. 2 to the left of the dash-dot line labelled FS closed. The potential impressed between the control electrode 75 and the cathode 73 of thyratron 2TU is the sum of the anode-cathode potential of 1TU, the potential in network N and the bias 33. This potential is negative as can be seen from the portion of graph $c$ to the left of the dash-dot line FS closed.

Since thyratron 1TU at this time is non-conducting transformer 3T is deenergized and discharge paths 3TU1 and 3TU2 are non-conducting. Transformer 4T is then deenergized and thyratrons 4TU and 5TU are non-conducting. The welding transformer T is then deenergized.

*Operation*

In describing the operation of the apparatus it is assumed that the switch SWC is set for multicycle welding. Preparatory to a welding operation resistor 5P is set to correspond to the power factor of the apparatus and 3P to produce the desired heat. Switch SWN is closed.

The work W is then placed on the electrode E2 and the electrode E1 is engaged with the work under pressure. Then the operator's switch FS is closed. It is assumed that the switch FS is closed at an instant represented by dash-dot line of Fig. 2.

The closing of the switch connects the cathodes 63 and 73 of thyratrons 1TU and 2TU to conductor AL2 which is connected to conductor DNP through resistor 87. The control potential impressed on thyratron 2TU is negative as shown by graph c so that thyratron 2TU does not conduct and there is no current flow through the drop resistor 87 between conductors AL2 and DPN. The second control electrode 67 of 1TU is then at the potential of the cathode 63. The potential impressed on the first control electrode 65 of 1TU is so phased that 1TU is capable of conducting only during a short interval at the beginning of the half-period turn which the anode 61 of 1TU is positive relative to the cathode 63. 1TU then conducts at the beginning of the positive half-period following the closing of FS as indicated in graph a.

The conduction of 1TU has two effects. First, the network is permitted to discharge as represented by the right-hand portion of curve N of graph a. Second, current flows during alternate half-periods through the primary 3TP. The flow of current through the primary 3TP during alternating half-periods produces a series of potential waves having the same general form as the waves labelled B3 of graph b of Fig. 2 which actually represents the potential provided by current flow through 2T (since in both cases a transformer 2T or 3T is supplied through a rectifier 83 or 1TU respectively). Each of these waves consist of a generally sinusoidal half-cycle of duration appreciably larger than a half-period of the potential between L1 and L2 followed by a loop of generally peaked wave forms. The peaked loop has a duration less than a half-period of the supply, but rises to a higher magnitude than the sinusoidal half-cycle.

The polarity of the secondary sections 121 and 123 of 3TS is such that when the potential on 3TS is generally sinusoidal the anode potential of 3TU1 is positive relative to the cathode. During these intervals then 3TU1 is capable of conducting. During the same intervals the potential supplied by the phase-shift network PS rises to a magnitude such as to permit 3TU1 to conduct at an instant determined by the setting of the network PS. 3TU1 then conducts supplying a potential to 4TS1 which counteracts the bias B1 rendering 4TU conducting. A half-cycle of current then flows through the primary P and the work W is supplied with current.

During the succeeding intervals when the potential of 3TS is reversed, section 123 of 3TS is so poled that rectifier 41 can conduct and unless 3TU2 conducts, capacitor 39 is charged substantially to the peak potential impressed on section 123.

During those intervals the potential of the phase-shift PS reverses so that 3TU2 is capable of conducting. If the network PS is set so that 3TU2 is capable of conducting early in the intervals when the potential existing across section 123 is substantial, path 3TU2 conducts being supplied directly from 123. If the network PS is set so that 3TU2 is capable of conducting later in the intervals when the potential supplied to the section 123 has fallen to zero the anode potential for 3TU2 is supplied by the capacitor 39 charged while potential existed across the secondary section 123.

The construction of transformer 3T is an important feature of this invention. The secondary sections 121 and 123 are unbalanced to compensate for the differences in the magnitudes of the voltages of opposite polarity existing at the terminals of these sections when the primary conducts current of only one polarity. This transformer may be bought from Acme Electric Company under designation Catalogue T30856.

The conduction of 3TU supplies current to 4TP so that the blocking potential of B2 is counteracted and thyratron 5TU conducts a half-cycle of current through the primary P and correspondingly energizing the work W. During the next interval of conduction of 3TS the above-described operation is repeated. Successive positive and negative half-cycle of current having a magnitude determined by the setting of the phase shift network PS thus flows through the transformer T so long as the primary 3TP conducts half-cycles of current.

The conduction 1TU continues while the network N is discharging. As the network N discharges, the negative potential which is impressed in the control circuit of thyratron 2TU gradually decreases and becomes positive as shown in graph c of Fig. 2. This control potential becomes positive during one of the intervals when the generally peaked loops are being supplied by the network B3. When the control potential becomes positive thyratron 2TU conducts. Since the potentials from B3 pass through their peak magnitudes at instants in the periods of potential of AL1—AL2 which occur substantially later than the instants of zero potential, 2TU is incapable of being rendered conducting at a beginning of a half-period. Thus the conduction 1TU at the beginning of the last of a series of half-periods is assured and conduction of 2TU before 1TU during any operation is precluded.

Once 2TU is rendered conducting current flows through the drop resistor 87 between the conductors AL2 and DNP. This impresses a blocking potential of thyratron 1TU rendering the latter non-conducting. Thyratron 2TU now continues to conduct so long as switch FS remains closed and this prevents the conduction of 1TU. A timed welding pulse is then derived for each closing of the switch FS.

To produce another welding, pulse FS must be opened. This resets the network N and makes feasible the carrying out of a subsequent weld.

Conclusion

A highly precise control for bench welder or for other welding purposes of relatively simple and low cost structure is in accordance with this invention provided. This control is capable of precisely timing the duration of the welding current and of precisely setting the magnitude of the welding current. While a preferred embodiment of this invention has been disclosed here, many modifications thereof are feasible. This invention then is not to be restricted except insofar as necessitated by the spirit of the prior art.

I claim as my invention:

1. A timer comprising in combination first and second conductors for supplying a potential, a first electric discharge device having an anode, a cathode and a control electrode, a second electric discharge device having an anode, a cathode and a control electrode, normally open starting switch means, a time-constant network, rectifier means, means connecting said anode of said first device to said first conductor, means including said switch means and connected to said cathodes for connecting said cathodes to said second conductor, means including said rectifier means connecting said network in circuit with said first and second conductors to be charged by the potential between said first and second conductors, said network when charged having a positive terminal and a negative terminal, means connecting said positive terminal to said anode of said first device and said negative terminal to said control electrode of said second device, voltage absorbing means, means including said voltage absorbing means connecting said control electrode of said first device to said second conductor, capacitive means, means connected to said capacitive means for charging said capacitive means with one of its terminals positive and the other negative, means connecting said last-named positive terminal to said anode of said second device and means including said absorbing means connecting said last-mentioned negative terminal to said second conductor.

2. A timer comprising in combination first and second conductors for supplying a potential, a first electric discharge device having an anode, a cathode and a control electrode, a second electric discharge device having an anode, a cathode and a control electrode, normally open starting switch means, a time-constant network, rectifier means, means connecting said anode of said first device to said first conductor, means including said switch means and connected to said cathodes for connecting said cathodes to said second conductor, means including said rectifier means connecting said network in circuit with said first and second conductors to be charged by the potential between said first and second conductors, said network when charged having a positive terminal and a negative terminal, means connecting said positive terminal to said anode of said first device and said negative terminal to said control electrode of said second device, voltage absorbing means, means including said voltage absorbing means connecting said control electrode of said first device to said second conductor, capacitive means, means connected to said capacitive means for charging said capacitive means with one of its terminals positive and the other negative, means connecting said last-named positive terminal to said anode of said second device, means including said absorbing means connecting said last-mentioned negative terminal to said second conductor, and means connected to said first device for assuring that said first device is rendered conductive substantially at the beginning of the first half-period following closure of said switch means when said anode is positive relative to said cathode.

3. A timer comprising in combination first and second conductors for supplying a potential, a first electric discharge device having an anode, a cathode and a control electrode, a second electric discharge device having an anode, a cathode and a control electrode, normally open starting switch means, a time-constant network, rectifier means of the low back-leakage type, means connecting said anode of said first device to said first conductor, means including said switch means and connected to said cathodes for connecting said cathodes to said second conductor, means including said rectifier means connecting said network in circuit with said first and second conductors to be charged by the potential between said first and second conductors, said network when charged having a positive terminal and a negative terminal, means connecting said positive terminal to said anode of said first device and said negative terminal to said control electrode of said second device, voltage absorbing means, means including said voltage absorbing means connecting said control electrode of said first device to said second conductor, capacitive means, means connected to said capacitive means for charging and capacitive means with one of its terminals positive and the other negative, means connecting said last-named positive terminal to said anode of said second device and means including said absorbing means connecting said last-mentioned negative terminal to said second conductor.

4. A timer comprising in combination first and second conductors for supplying a potential, a first electric discharge device having an anode, a cathode and a control electrode, a second electric discharge device having an anode, a cathode and a control electrode, normally open starting switch means, a time-constant network, rectifier means, means connecting said anode of said first device to said first conductor, means including said switch means and connected to said cathodes for connecting said cathodes to said second conductor, means including said rectifier means connecting said network in circuit with said first and second conductors to be charged by the potential between said first and second conductors, said network when charged having a positive terminal and a negative terminal, means connecting said positive terminal to said anode of said first device and said negative terminal to said control electrode of said second device, voltage absorbing means, means including said voltage absorbing means connecting said control electrode of said first device to said second conductor, means connected to said conductors for producing a direct current potential having a positive terminal and a negative terminal, means connecting said anode of said second device to said last-named positive terminal and means including said absorbing means connecting said last-mentioned negative terminal to said second conductor.

5. A timer comprising first and second conductors for supplying an alternating potential, a first electric discharge device having an anode, a cathode and a control electrode, a second electric discharge device having an anode, a cathode and a control electrode, normally open starting switch means, a time-constant network, rectifier means, a positive and a negative conductor for supplying a direct current potential, means connecting said anode of said first device to said first conductor, means connected to said cathodes including said switch means for connecting said cathodes to said second conductor, voltage absorbing means, means connecting said anode of said second device to said positive conductor, means including said voltage absorbing means connecting said negative conductor to said second conductor, means including said rectifier means connecting said network between said first conductor and said second conductor to charge said network so that said network has a positive terminal and a negative terminal, means for producing an alternating current biasing potential, means including said biasing potential connecting said negative terminal to said control electrode of said second device, means connecting said positive terminal to said anode of said first device, and means connecting said control electrode of said first device to said negative conductor, said biasing potential being of such amplitude and so phased as to counteract the sum of the potentials derivable from said network and said conductors when the potential derivable from said conductors is most positive with reference to said second conductor and thus to prevent conduction of said second device as long as said network is charged to a predetermined potential.

6. In combination, conductors for supplying an alternating potential, an electric discharge device having an anode, a cathode and a control electrode, means connected to said anode and cathode for impressing a potential between said anode and cathode, a transformer having a primary and a secondary, rectifier means, means including said rectifier, means connecting said primary between said conductors, and means connecting said secondary between said control electrode and cathode.

7. In combination, conductors for supplying an alternating potential, an electric discharge having an anode, a cathode and a control electrode, means connected to said conductors and to said anode and cathode for impressing a direct current potential between said anode and cathode, a transformer having a primary and a secondary, rectifier means, means including said rectifier means connecting said primary between said conductors, and means connecting said secondary between said control electrode and cathode.

8. In combination, a first and a second conductor for supplying an alternating potential, an electric discharge device having an anode, a cathode and a control electrode, a time-constant network, rectifier means, means including said rectifier means connecting said network to said conductors to be charged substantially to the peak potential between said conductors so that said network has a positive terminal and a negative terminal, alternating bias potential supply means, means including said bias potential and said network connecting said control electrode to said first conductor with said negative terminal electrically nearer said control electrode and said positive terminal electrically nearer said first conductor, means connecting said cathode to said second conductor, means connected to said anode and cathode for impressing an energizing potential between said anode and cathode, and switch means connecting said positive terminal to said second conductor, said bias potential being poled to maintain said device non-conducting with said network charged to a predetermined potential.

9. In combination, a first and a second conductor for supplying an alternating potential, an electric discharge device having an anode, a cathode and a control electrode, a time-constant network, rectifier means of the low back-leakage type and rectifier means of the type having substantially higher leakage, means including both said rectifier means connecting said network to said conductors to be charged substantially to the peak potential between said conductors so that said network has a positive terminal and a negative terminal, said low back-leakage rectifier means being electrically nearer said second conductor and said higher leakage rectifier means being electrically nearer said first conductors, alternating bias potential supply means, means including said bias potential, said higher back-leakage rectifier means and said network connecting said control electrode to said first conductors with said negative terminal electrically nearer said control electrode and said positive terminal electrically nearer said first conductor, means connecting said cathode to said second conductor, means connected to said anode and cathode for impressing an energizing potential between said anode and cathode, and switch means connecting said positive terminals to said second conductor, said bias potential being poled to maintain said device non-conducting with said network charged to a predetermined potential.

10. In combination, a first and a second conductor for supplying an alternating potential, an electric discharge device having an anode, a cathode and a control electrode, a time-constant network, rectifier means of the low back-leakage type, means including said rectifier means connecting said network to said conductors to be charged substantially to the peak potential between said conductors so that said network has a positive terminal and a negative terminal, alternating bias potential supply means, means including said bias potential and said network connecting said control electrode to said first conductor with said negative terminal electrically nearer said control electrode and said positive terminal electrically nearer said first conductor, means connecting said cathode to said second conductor, means connected to said anode and cathode for impressing an energizing potential between said anode and cathode, and switch means connecting said positive terminal to said second conductor, said bias potential being poled to maintain said device non-conducting with said network charged to a predetermined potential.

11. Timing apparatus including conductors for supplying a potential, means for deriving from said apparatus a signal during the timing interval thereof, an electric discharge device having an anode, a cathode and a control electrode, rectifier means, a time constant network, means including said deriving means and said rectifier means connecting said anode and cathode in a circuit between said conductors so as to conduct current of one polarity through said deriving means, means including said deriving means and said rectifier means connecting said network so as to be charged through said deriving means, and means connected to said network and to said control electrode for controlling the conduction of said device in accordance with the charge on said network.

12. In combination, conductors for supplying a potential, a time-constant network, means connected to said network and to said conductors for charging said network by the potential between said conductors, said charging means including rectifier means, and normally-open circuit means connected to said rectifier means when closed for diverting the charging current flowing through said rectifier means from said network, said charging means including means preventing the discharge of said network through said normally-open circuit means when said normally-open circuit means is closed.

13. In combination, conductors for supplying a potential, a time-constant network, means connected to said network and to said conductors for charging said network by the potential between said conductors, said charging means including rectifier means, and normally-open circuit means connected to said rectifier means when closed for diverting the charging current flowing through said rectifier means from said network, said charging means including additional rectifier means preventing the discharge of said network through said normally-open circuit means when said normally-open circuit means is closed.

14. In combination, conductors for supplying a potential, a time-constant network, a charging circuit for charging said network from said conductors and including asymmetrically conductive means electrically on each side of said network for conducting the charging current to and away from said network, and normally-open circuit means connected to the asymmetrically conducting means which conducts the charging current to said network for diverting said charging current.

15. In combination, conductors for supplying a potential, a time-constant network, a charging circuit for charging said network from said conductors and including asymmetrically conductive means electrically on each side of said network for conducting the charging current to and away from said network, normally-open circuit means connected to the asymmetrically conducting means which conducts the charging current to said network for diverting said charging current, and connections between said network and said normally-open circuit means for controlling said normally-open circuit means in accordance with the charge on said network.

16. A timer comprising first and second conductors for supplying an alternating potential, third and fourth conductors for supplying a direct-current potential, said third conductor being electrically more positive than said fourth conductor, a first electric discharge device of the gaseous type having an anode, a cathode and a control electrode, means connected to said anode for connecting said first conductor to said anode, means connected to said cathode for connecting said second conductor to said cathode, a second electric discharge device of the gaseous type including an anode, a cathode and a control electrode, means connected to said last-named anode for connecting said third conductor to said last-named anode, means connected to said last-named cathode for connecting said fourth conductor to said last-named cathode, a time constant network, means connected to said network and to said first device effective so long as said first device is conducting for charging said network, means connected to said first device and to said network effective while said first device is conducting and while said network is charged to a predetermined potential to impress a potential on said control electrode of said second device such as to block conduction of said second device, and means connected to said second device and to said control electrode of said first device, effective while said second device is conducting to block conduction of said first device.

17. A timer comprising first and second conductors for supplying an alternating potential, third and fourth conductors for supplying a direct-current potential, said third conductor being electrically more positive than said fourth conductor, a first electric discharge device of the gaseous type having an anode, a cathode and a control electrode, means connected to said anode for connecting said first conductor to said anode, means connected to said cathode for connecting said second conductor to said cathode, a second electric discharge device of the gaseous type including an anode, a cathode and a control electrode, means connected to said last-named anode for connecting said third conductor to said last-named anode, means connected to said last-named cathode for connecting said fourth conductor to said last-named cathode, a time constant network, means connecting said network between said anode of said first device and said control electrode of said second device, means connected to said network and to said first device effective so long as said first device is conducting for charging said network, means connected to said cathode of said first device and to said network effective while said first device is conducting and while said network is charged to a predetermined potential to impress a potential on said control electrode of said second device such as to block conduction of said second device, and means connected to said second device and to said control electrode of said first device, effective while said second device is conducting to block conduction of said first device.

18. A timer comprising first and second conductors for supplying an alternating potential, third and fourth conductors for supplying a direct-current potential, said third conductor being electrically more positive than said fourth conductor, a first electric discharge device of the gaseous type having an anode, a cathode and a control electrode, selectively operable switch means, means including said switch means connecting said anode and cathode between said first conductor and said second conductor, a second electric discharge device of the gaseous type including an anode, a cathode and a control electrode, means including said switch means connecting said anode and cathode of said second device between said third conductor and said fourth conductor with said anode electrically nearer said third conductor than said cathode, a time constant network, means connected to said network and to said first device effective so long as said first device is conducting for charging said network, means connected to said first device and to said network effective while said first device is conducting and while said network is charged to a predetermined potential to impress a potential on said control electrode of said second device such as to block conduction of said second device, and means connected to said second device and to said control electrode of said first device, effective while said second device is conducting to block conduction of said first device.

19. A timer including first and second gaseous electric discharge devices each having an anode and a cathode, and a time-constant network, said first device being connected to conduct during the interval time and said network being charged and being connected between said first device and said second device to discharge while said first device conducts and to block conduction of said second device while it is so being discharged and until its potential is reduced to a predetermined magnitude by the discharge and said second device being connected to said first device so that while said second device conducts it blocks conduction of said first device, the said timer being characterized by that said anode and cathode of said first device are supplied with alternating potential and said anode and cathode of said second device with direct current potential.

References Cited in the file of this patent

UNITED STATES PATENTS

| | | |
|---|---|---|
| 2,227,815 | Toulon | Jan. 7, 1941 |
| 2,366,197 | Klemperer | Jan. 2, 1945 |
| 2,605,448 | Rockafellow | July 29, 1952 |
| 2,656,461 | Elliott | Oct. 20, 1953 |
| 2,715,698 | Riley et al. | Aug. 16, 1955 |
| 2,740,044 | Storm | Mar. 27, 1956 |
| 2,780,750 | Parsons | Feb. 5, 1957 |